(12) United States Patent
Watanabe

(10) Patent No.: US 9,126,547 B2
(45) Date of Patent: Sep. 8, 2015

(54) COVER STRUCTURE OF VEHICLE BODY OUTER PANEL COUPLING PART

(71) Applicant: HONDA MOTOR CO., LTD., Minato-ku, Tokyo (JP)

(72) Inventor: Yasunori Watanabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/367,310

(22) PCT Filed: Oct. 25, 2012

(86) PCT No.: PCT/JP2012/077571
§ 371 (c)(1),
(2) Date: Jun. 20, 2014

(87) PCT Pub. No.: WO2013/094304
PCT Pub. Date: Jun. 27, 2013

(65) Prior Publication Data
US 2014/0346814 A1    Nov. 27, 2014

(30) Foreign Application Priority Data

Dec. 21, 2011  (JP) ................................. 2011-279935

(51) Int. Cl.
  *B60R 13/04*   (2006.01)
  *B62D 25/04*   (2006.01)
  *B62D 25/06*   (2006.01)

(52) U.S. Cl.
  CPC ............... *B60R 13/04* (2013.01); *B62D 25/04* (2013.01); *B62D 25/06* (2013.01)

(58) Field of Classification Search
  CPC ........ B60R 13/04; B62D 25/04; B62D 25/26; B62D 25/07

USPC ........... 296/203.01, 203.03, 193.05, 210, 29, 296/213; 52/459, 465, 469, 471
See application file for complete search history.

(56) References Cited

U.S. PATENT DOCUMENTS

| 4,930,279 A * | 6/1990 | Bart et al. ........................ 52/466 |
| 5,730,446 A * | 3/1998 | Taylor et al. ................... 277/312 |
| 2007/0193171 A1 * | 8/2007 | Finerman et al. ............... 52/459 |

FOREIGN PATENT DOCUMENTS

| JP | 01-152049 A  | 6/1989 |
| JP | H06-16909 Y2 | 5/1994 |
| JP | 11-170927 A  | 6/1999 |
| JP | 2000-071900 A | 3/2000 |
| JP | 2001-515190 A | 9/2001 |
| JP | 2011-088494 A | 5/2011 |
| JP | 2011-195107 A | 10/2011 |
| WO | 99/08899 A1 | 2/1999 |

* cited by examiner

*Primary Examiner* — Dennis H Pedder
(74) *Attorney, Agent, or Firm* — Carrier Blackman & Associates, P.C.; William D. Blackman; Joseph P. Carrier

(57) ABSTRACT

A cover member of a vehicle body outer panel coupling part covers a step portion with a height difference that is just the thickness of a sheet thickness, by overlapping a roof side rail outer panel, which has a surface that continues to a surface of a vehicle body, on a center pillar outer panel, which has the surface. The cover member comprises: a cover body that is attached to a coupling recess, and is obtained by mixing a magnetic power with a thermoplastic resin; and an adhesive resin layer that is applied to an attachment surface that forms an inner surface facing the center pillar outer panel and the roof side rail outer panel of the cover body.

4 Claims, 10 Drawing Sheets

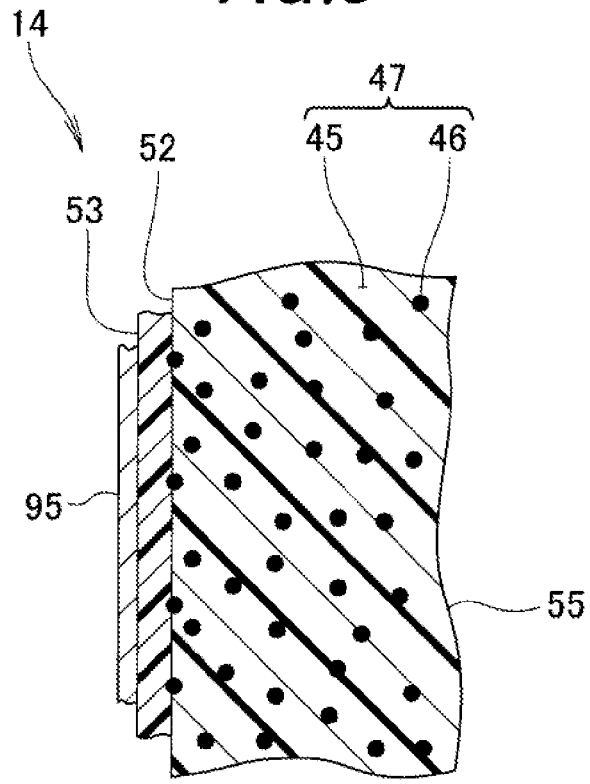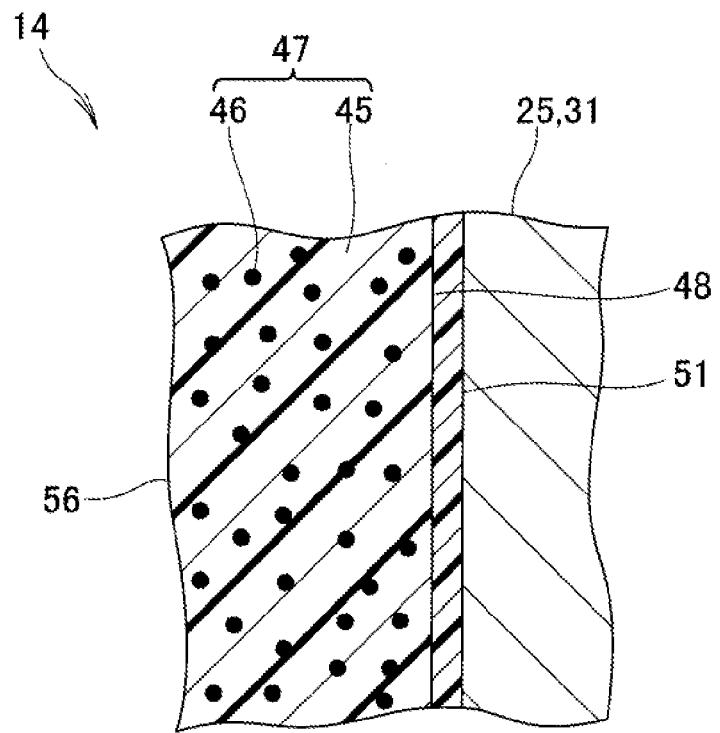

COVER STRUCTURE OF VEHICLE BODY OUTER PANEL COUPLING PART

TECHNICAL FIELD

The present invention relates to a cover structure of a vehicle-body outer panel connection portion configured to cover a connection portion of a vehicle surface connected with a plurality of outer panels made of a steel sheet.

BACKGROUND ART

For example, as disclosed in Patent Literature 1, a vehicle-body outer panel connection portion is known which is formed by joining a portion extending from a roof to a top of a center pillar. In such a vehicle-body outer panel connection portion, the center pillar is plastic-worked as a separate body using a high-tensile steel sheet, a roof rail is plastic-worked using a normal steel sheet, and the center pillar and the roof rail are connected to each other in the vicinity of the roof rail.

However, in the connection structure disclosed in Patent Literature 1, a step between overlapped panel members may occur in the connection portion between the top of the center pillar and the roof rail or welding marks may remain, thereby causing deterioration in appearance. Further, it is necessary to cover an outer panel edge forming a stepped portion of the connection portion with a dust sealer to prevent corrosion of the outer panel edge and thus working time for dust sealer application is required.

Further, a vehicle body for covering a connection portion is disclosed in Patent Literature 2. In the vehicle body, each of pillars such as the center pillar is vertically divided into two portions, a stepped portion formed at a boundary portion in which the upper and lower center pillars are connected to each other, and a seal tape is stuck on the stepped portion, with which a seal member provided on a door comes in contact, out of the stepped portion.

In the vehicle body disclosed in Patent Literature 2, since the seal tape is stuck on only a position corresponding to the seal member provided on the door, the seal tape is not present in the rest of the stepped portion. Thus, the stepped portion is formed in the connected portion and remains in an exposed state, thereby causing the deterioration in appearance. In addition, since the shape of the seal tape depends on the step of the connection portion, it is difficult to match the step corresponding to the seal tape with the step of the connection portion in sticking work and to perform the sticking work.

PRIOR ART LITERATURE

Patent Literatures

Patent Literature 1: JP 2011-195107 A
Patent Literature 2: JP 2011-88494 A

SUMMARY OF INVENTION

Technical Problem

An object of the present invention is to provide a cover structure of a vehicle-body outer panel connection portion capable of saving the time required to cover a connection portion (portion in which a step occurs) with a dust sealer, easily covering a stepped portion of the connection portion, and achieving improvement in appearance and acquirement of water tightness.

Solution to Problem

According to a first aspect of the invention, there is provided a cover structure of a vehicle-body outer panel connection portion, the cover structure including: a first vehicle-body outer panel that is made of a steel sheet and has a surface of a vehicle body; a second vehicle-body outer panel that is made of a steel sheet and has a surface which is continuous to the surface; and a cover member that covers a stepped portion having a height difference by a panel thickness resulted after an end portion of the second vehicle-body outer panel is connected in an overlapping manner to an end portion of the first vehicle-body outer panel, wherein the stepped portion is located in a connection recess portion which is formed by connecting a second bent portion, in which the end portion of the second vehicle-body outer panel is deformed centerward in a vehicle width direction, to a first bent portion in which the end portion of the first vehicle-body outer panel is deformed toward the center in the vehicle width direction, and the cover member is attached to the connection recess portion and is made up of a cover body of a thermoplastic resin and a bonding film layer which is applied to an attachment surface forming an inner surface of the cover body facing the first vehicle-body outer panel and the second vehicle-body outer panel.

In a second aspect of the invention, preferably, the cover body is formed by mixing magnet powders with the thermoplastic resin.

In a third aspect of the invention, preferably, the cover member includes a painted base film layer applied to an outer surface of the cover body.

In a fourth aspect of the invention, preferably, the cover body is made up of a thick-walled body portion formed with a thickness corresponding to a depth of the connection recess portion at a center thereof and a lip portion which is continuous to the body portion, the body portion is configured by forming the outer surface of the cover body in a convex curved shape, and the lip portion has a wall thickness which gradually decreases from the body portion toward fringes of the cover body, and, out of the fringes, a fringe of a door seal contacting portion coming in contact with a seal member provided in a door is formed with a step-free thickness in relation to the first vehicle-body outer panel and the second vehicle-body outer panel.

In a fifth aspect of the invention, preferably, the first vehicle-body outer panel is a roof outer panel, the second vehicle-body outer panel is a roof side rail outer panel, the connection recess portion is a roof rail connection recess portion formed by connecting the roof side rail outer panel to the roof outer panel, and the cover member is provided in a corner of the roof rail connection recess portion and is formed in a substantially triangular cross-sectional shape.

In a sixth aspect of the invention, preferably, the cover member covers a stepped portion formed in the roof rail connection recess portion.

In a seventh aspect of the invention, preferably, the lip portion is formed in the substantially triangular cross-sectional shape.

Advantageous Effects of Invention

According to the first and second aspects of the invention, when the cover member is provided in the connection recess portion by the magnetic force in the middle (dust sealer application process) of the painting process and the vehicle body (applied paint) is subjected to the temperature rising by the painting drying furnace in the drying process of the painting process after the painting of the painting process, the bonding film layer of the cover member is melted while the thermoplastic resin of the cover body is softened, the cover member is each bonded to the surface of the connection recess portion and the surface near the connection recess portion attracted to the first vehicle-body outer panel and the second vehicle-body outer panel, which are made of the steel sheet, respectively, by the magnetic force of the magnet powder. As a result, the water tightness is acquired and the dust sealer is not required to be applied to the connection portion (stepped portion) between the first vehicle-body outer panel and the second vehicle-body outer panel.

Particularly, according to the second aspect of the invention, the cover body has the magnetic force, and even when the variation in the shape of the connection recess portion is relatively large, since the position of the cover member can be adjusted several times to improve the appearance and to match with each connection recess portion, the cover member is easy to handle.

According to the third aspect of the invention, since the cover member includes the painted base film layer applied to the outer surface of the cover body, the cover member is provided in the connection recess portion by the magnetic force in the middle (dust sealer application process) of the painting process, and subsequently, when the paint is applied to the first vehicle-body outer panel and the second vehicle-body outer panel in the painting process of applying the paint during the painting process, this paint can be continuously applied to the painted base film layer of the cover body to apply the paint having the same painting color as the painting color of the vehicle color.

In addition, since the magnet powder protrudes from the resin molding surface, the surface of the cover body is rough, but it is possible to reduce the roughness of the surface of the cover body by the painted base film layer and to achieve the smoothness of the surface of the cover body. As a result, it is possible to fix the paint for applying to the first vehicle-body outer panel and the second vehicle-body outer panel onto the cover body through the painted base film layer and to improve the appearance even though the cover member is provided.

According to the fourth aspect of the invention, the cover body is made up of the thick-walled body portion and the lip portion connected continuously to the body portion, the body portion is configured by forming the outer surface in the convex curved shape, the wall thickness of the lip portion gradually decreases from the body portion toward the fringes, and in the fringes, the fringes of the door seal contacting portions coming in contact with seal members provided in the doors are formed with the step-free thickness in relation to the first vehicle-body outer panel and the second vehicle-body outer panel. Accordingly, the seal members provided in the doors can be in continuously contact with the first vehicle-body outer panel and the second vehicle-body outer panel in the state of being in contact with the cover member, the gap is not formed at the boundary between the fringe and the first vehicle-body outer panel and the boundary between the fringe and the second vehicle-body outer panel with respect to the seal member, the sealing property (water tightness) of the seal member provided in the door can be improved, the shape retention can be improved since the step remains in the fringes other than the fringe of the door seal contacting portion, and the cover member is never bent and caught by the vehicle body during being mounted onto the vehicle body even though the cover member has the U-shape.

According to the fifth aspect of the invention, the first vehicle-body outer panel is the roof outer panel, the second vehicle-body outer panel is the roof side rail outer panel, the connection recess portion is the roof rail connection recess portion formed by joining the roof side rail outer panel to the roof outer panel, and the cover member is provided in the corner of the roof rail connection recess portion and is formed in the substantially triangular cross-sectional shape. Accordingly, the shape of the cover member is approximately identical to that of the corner of the roof rail connection recess portion and is stably attached thereto even by the magnetic force, the corner becomes the smooth surface to have the good appearance, the process of finely adjusting the shape of the cover member is not necessary to be added in the painting process, the attaching work is completed only by directly setting the cover member, and thus only the setting work time may be set. In other words, it is possible to reduce the time of attaching the cover member and the time of finishing by applying the dust sealer.

According to the sixth aspect of the invention, since the cover member covers the stepped portion, the cover member can cover the fringe (edge) in which the stepped portion is formed and the dust sealer is not necessary to be applied to cover the fringe (edge). In general, the base paint is painted on the vehicle body by the electro-deposition, but the thickness of the electro-deposition painted film of the paint to be applied to the fringe (edge) becomes thin. For this reason, it is necessary to apply the dust sealer, but the dust sealer for covering the fringe (edge) can be eliminated by the cover member in the present invention.

According to the seventh aspect of the invention, since the lip portion is formed in the substantially triangular cross-sectional shape, the cover member is smoothly continuous toward the first vehicle-body outer panel and the second vehicle-body outer panel to form the smooth surface, thereby further improving the appearance.

BRIEF DESCRIPTION OF DRAWINGS

FIG. 6 is an enlarged view of region 6 of FIG. 3;

FIG. 7 is an enlarged view of region 7 of FIG. 3;

DESCRIPTION OF EMBODIMENTS

Several preferred embodiments of the present invention will be described in detail below with reference to the accompanying drawings.

First Embodiment

Figure 1:
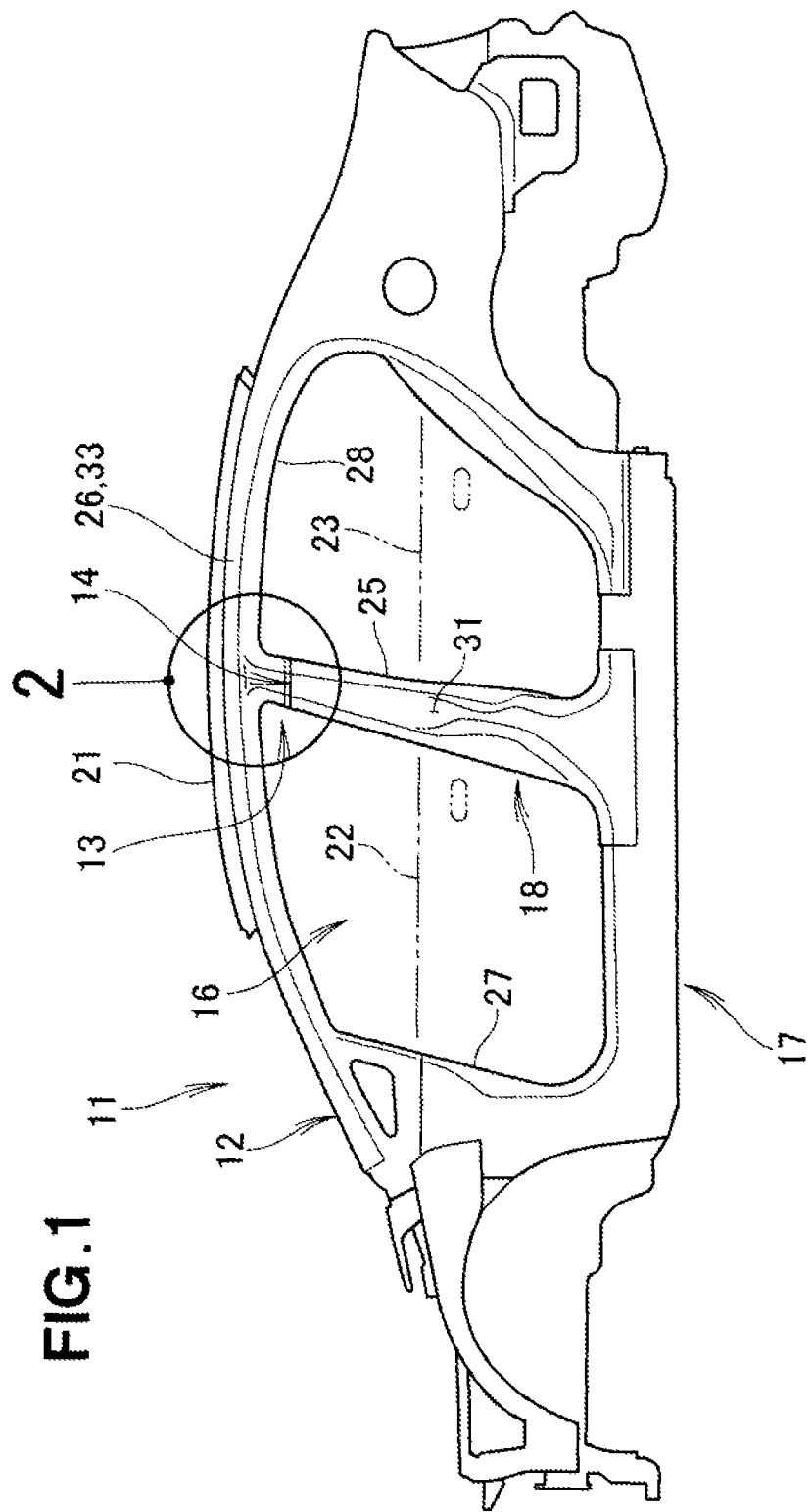
FIG. 1 is a side view illustrating a vehicle body employing a cover member of a vehicle-body outer panel connection portion according to a first embodiment of the present invention.
Figure 2:
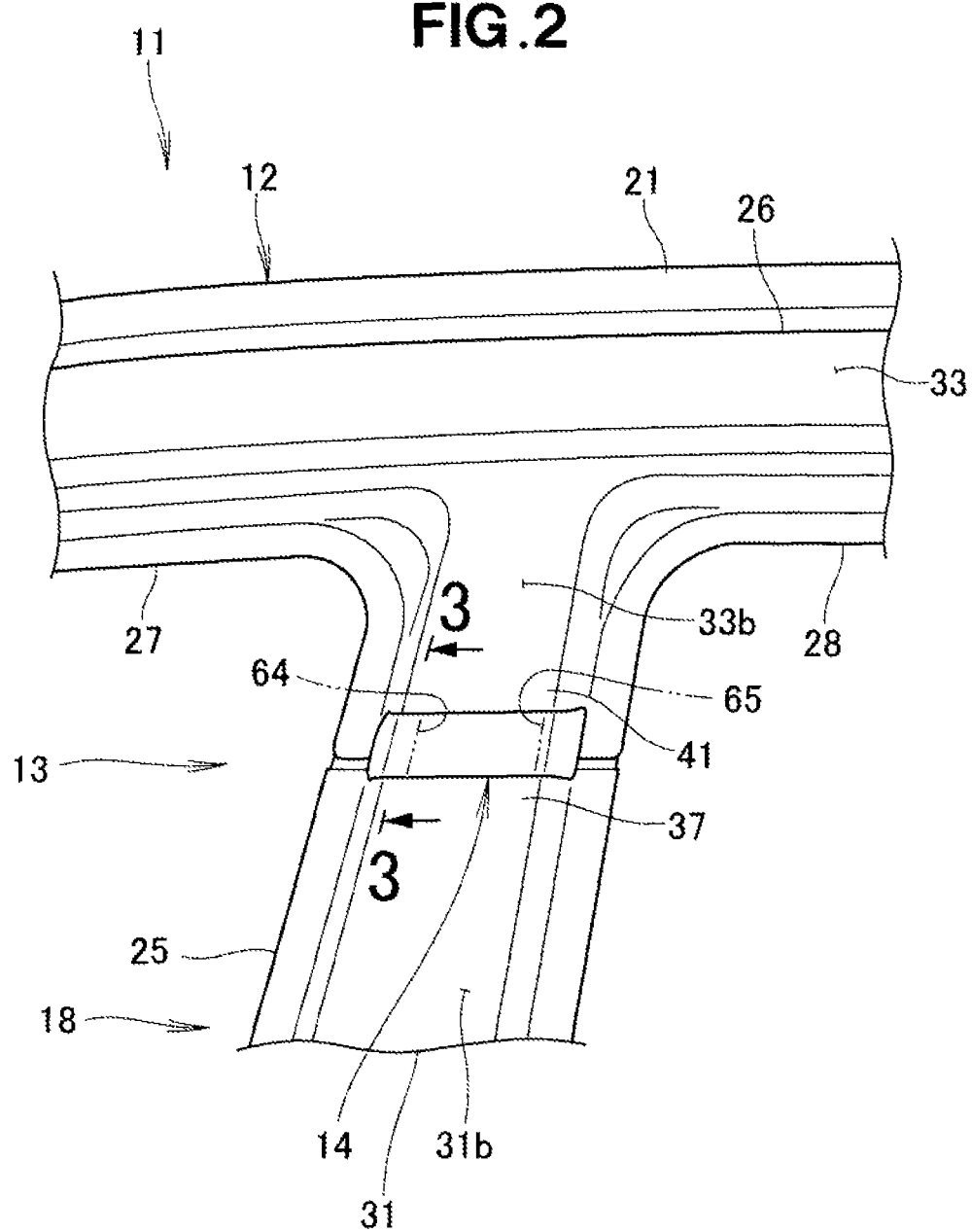
FIG. 2 is an enlarged view of region 2 of FIG. 1.

Referring now to FIGS. 1 and 2, a vehicle 11 includes a vehicle body 12 employing cover member 14 of a vehicle-body outer panel connection portion 13 according to a first embodiment. The vehicle body 12 includes an under body 17, a side body 18 forming sidewalls, and a roof 21, and these members form a vehicle interior 16. A front door 22 and a rear door 23 are attached to the side body 18.

The side body 18 includes a center pillar 25, a roof side rail 26 (also see FIG. 8), a front riding opening portion 27 to which the front door 22 is attached, and a rear riding opening portion 28 to which the rear door 23 is attached.

Figure 3:
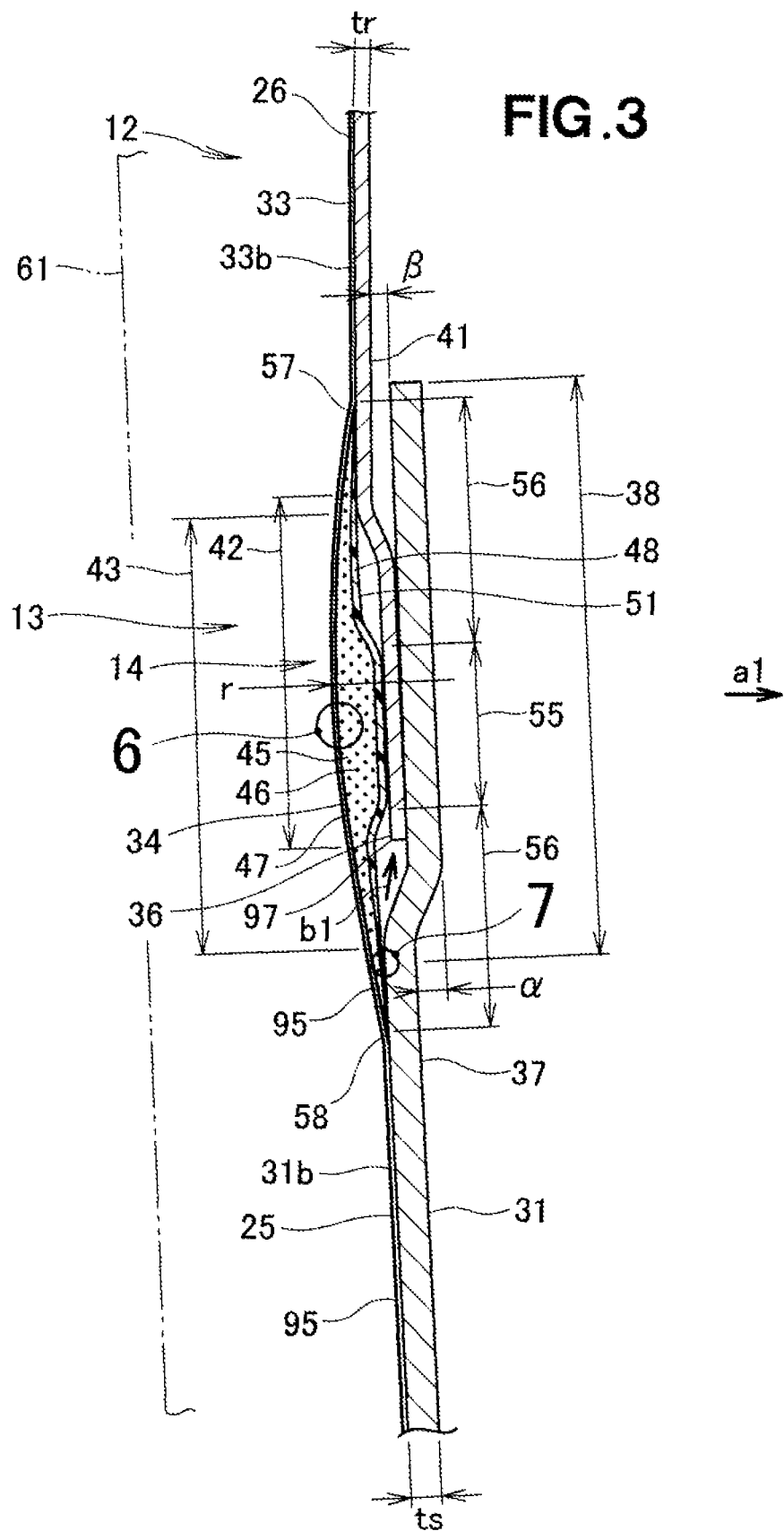
FIG. 3 is an enlarged cross-sectional view taken along line 3-3 of FIG. 2.

As illustrated in FIGS. 2 and 3, the center pillar 25 includes a center pillar outer panel (first vehicle-body outer panel) 31 forming a surface and an inner panel (not illustrated). The roof side rail 26 includes a roof side rail outer panel (second vehicle-body outer panel) 33 forming a surface.

Figure 9:
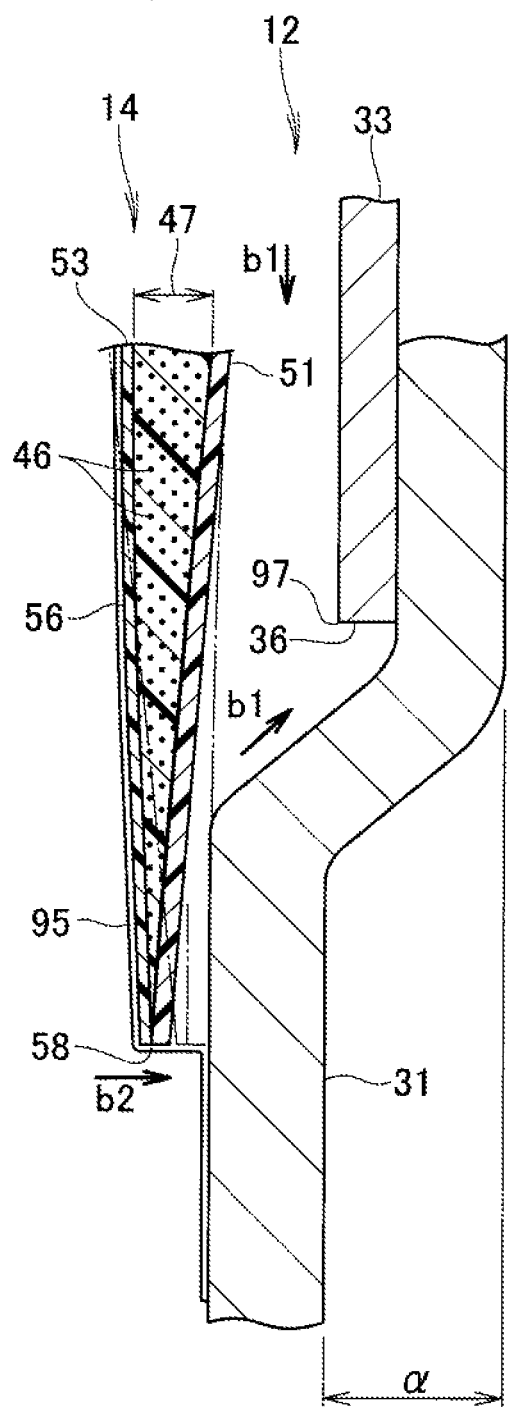
FIG. 9 is a cross-sectional view illustrating the cover member as being bonded to the vehicle body.

The cover member 14 of the vehicle-body outer panel connection portion 13 according to the first embodiment will be described below. FIGS. 6, 7 and 9 are diagrams which are schematically illustrated in which particle diameters of magnet powders 46, a thickness of a bonding film layer 51, a thickness of a painted base film layer 53, a thickness of a painted film 95 are conceptually illustrated.

FIG. 9 illustrates a lower fringe 58 of a portion coming in contact with seal members (front door seal member 61 and rear door seal member 62 in FIG. 5) of the door in the cover member 14.

As illustrated in FIG. 3, the cover member 14 of the vehicle-body outer panel connection portion 13 covers a stepped portion 36 with a height difference by the thickness of a panel thickness "tr" by overlappingly joining an end portion 41 of the roof side rail outer panel 33 made of a steel sheet and having a surface 33b which is continuous to a surface 31b to an end portion 37 of the center pillar outer panel 31 made of a steel sheet and having the surface 31b of the vehicle body 12.

The stepped portion 36 is disposed in a connection recess portion 43 formed by joining a first bent portion 38, in which the end portion 37 of the center pillar outer panel 31 is pushed into the inside (direction of an arrow a1) of the vehicle body 12, to a second bent portion 42, in which the end portion 41 of the roof side rail outer panel 33 is pushed into the inside (direction of the arrow a1) of the vehicle body 12, using spot welding in a state where the second bent portion 42 is overlapped on the first bent portion 38 from the outside.

The cover member 14 is attached to the connection recess portion 43 and is made up of a cover body 47, which is formed by mixing the magnet powders 46 into a thermoplastic resin 45, and the bonding film layer 51 applied to an attachment surface 48 (see FIG. 7), which forms an inner surface of the cover body 47 facing the center pillar outer panel 31 and the roof side rail outer panel 33. As illustrated in FIG. 6, the cover member 14 includes the painted base film layer 53 applied to the outer surface 52 of the cover body 47.

As illustrated in FIG. 3, the cover body 47 is made up of a thick-walled body portion 55 formed with a thickness corresponding to the depth of the connection recess portion 43 at the center of the cover body and a pair of lip portions 56 connected continuously to the body portion 55 to extend to the center pillar outer panel 31 and the roof side rail outer panel 33. The body portion 55 is configured by forming an outer surface in a convex curved shape (e.g., having radius of "r").

Figure 5:
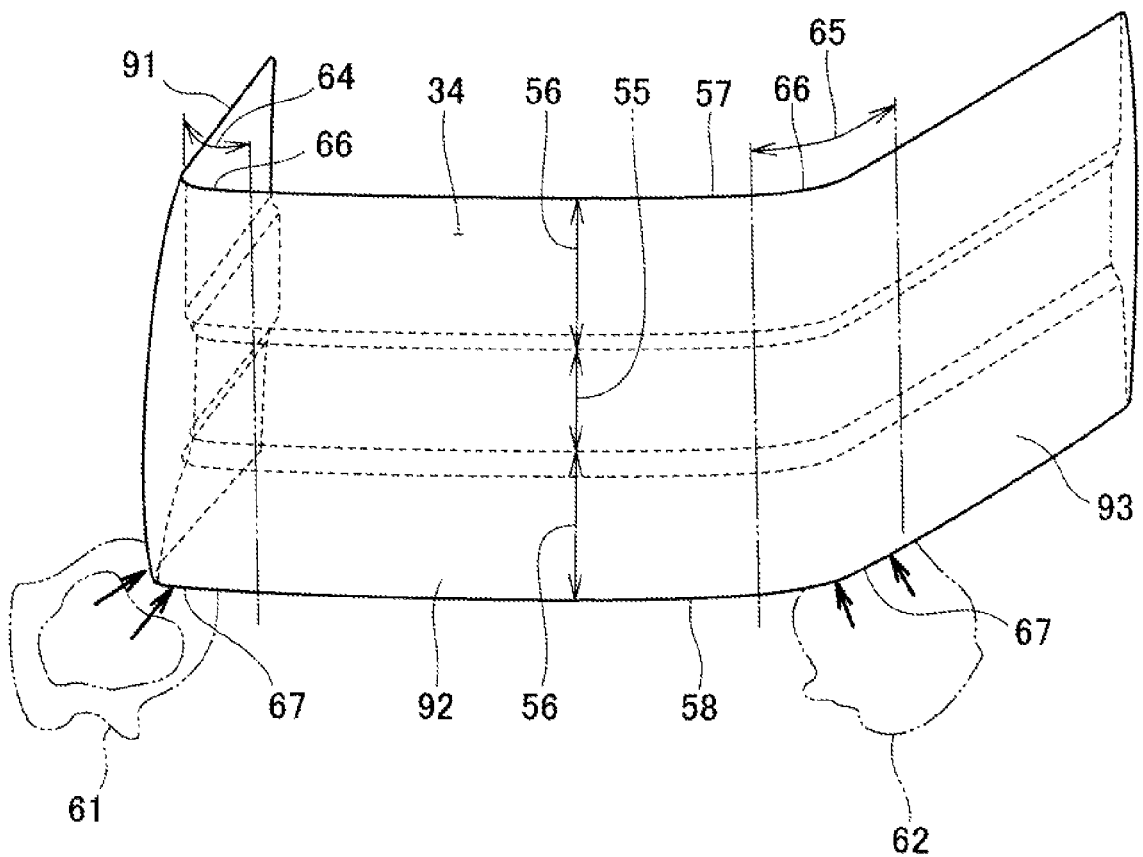
FIG. 5 is a perspective view of the cover member of FIG. 2.

As illustrated in FIGS. 3 and 5, the wall thickness of the lip portions 56 gradually decreases from the body portion 55 toward fringes (upper fringe 57 and lower fringe 58). In the upper fringe 57 and the lower fringe 58, fringes (upper fringe 66 and lower fringe 67) of door seal contacting portions (front door seal contacting portion 64 and rear door seal contacting portion 65) coming in contact with seal members (front door seal member 61 and rear door seal member 62 in FIG. 5) provided in the front door 22 and the rear door 23 (see FIG. 1) are formed such that the convex curved outer surface of the cover body lies substantially continuously on outer surfaces of the first and second vehicle body outer panels with a step-free thickness in relation to the center pillar outer panel 31 and the roof side rail outer panel 33, that is, with a minimal thickness (e.g., thickness of 0.05 mm in detail). Other lip portions are improved in stiffness by increasing thicknesses of fringes (remaining fringes other than the upper fringe 66 and the lower fringe 67 of the front door seal contacting portion 64 and the rear door seal contacting portion 65) in the range of 0.5 mm or less, and thus the shape retention of U-shape is ensured and deformation hardly occurs during mounting.

The cover member 14 covers the stepped portion 36. The lip portion 56 is formed in a substantially triangular cross-sectional shape as illustrated in FIG. 3.

The center pillar outer panel 31, the roof side rail outer panel 33, and the cover member 14 according to the first embodiment will be described below in detail.

Figure 4:
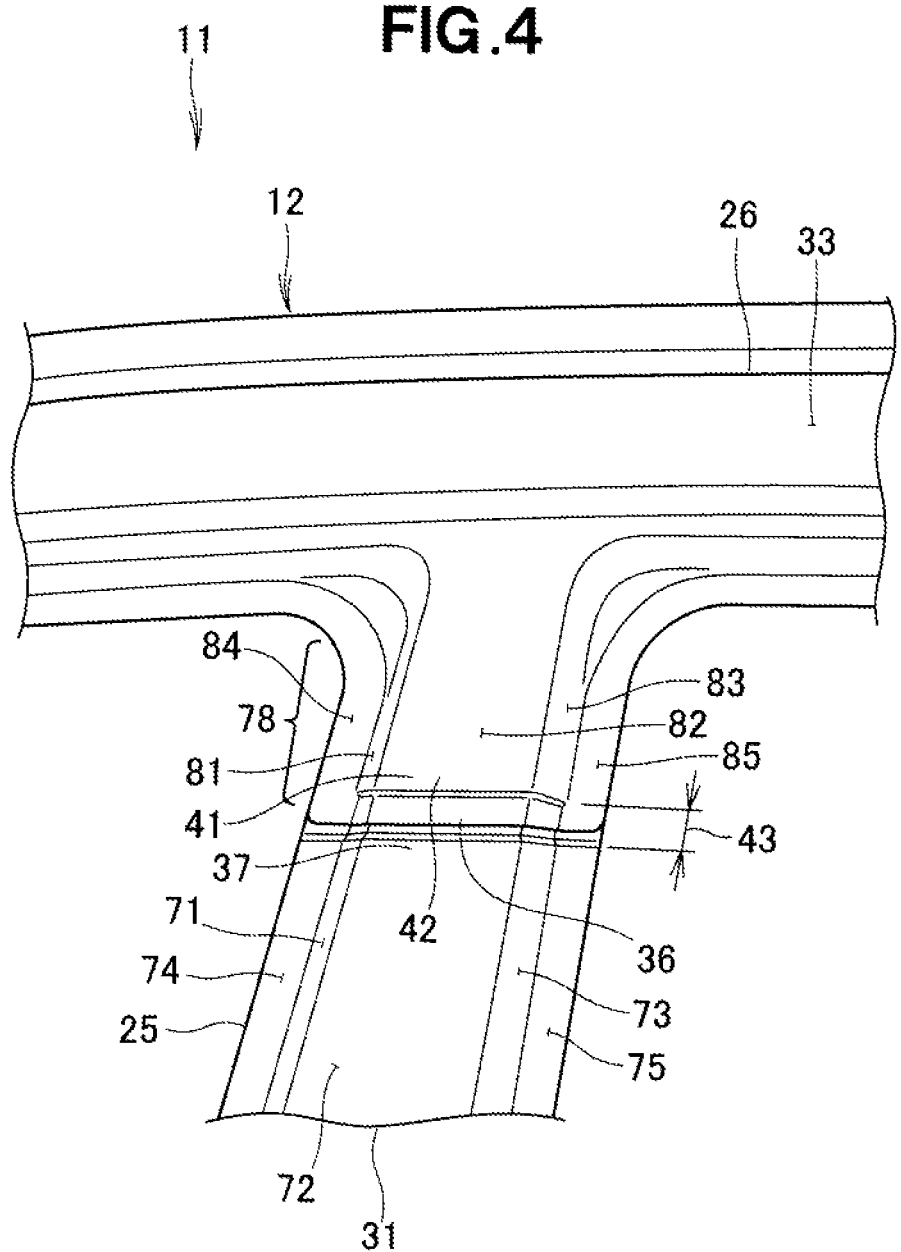
FIG. 4 is a view similar to FIG. 2 but illustrating a state in which the cover member is removed.
Figure 8:
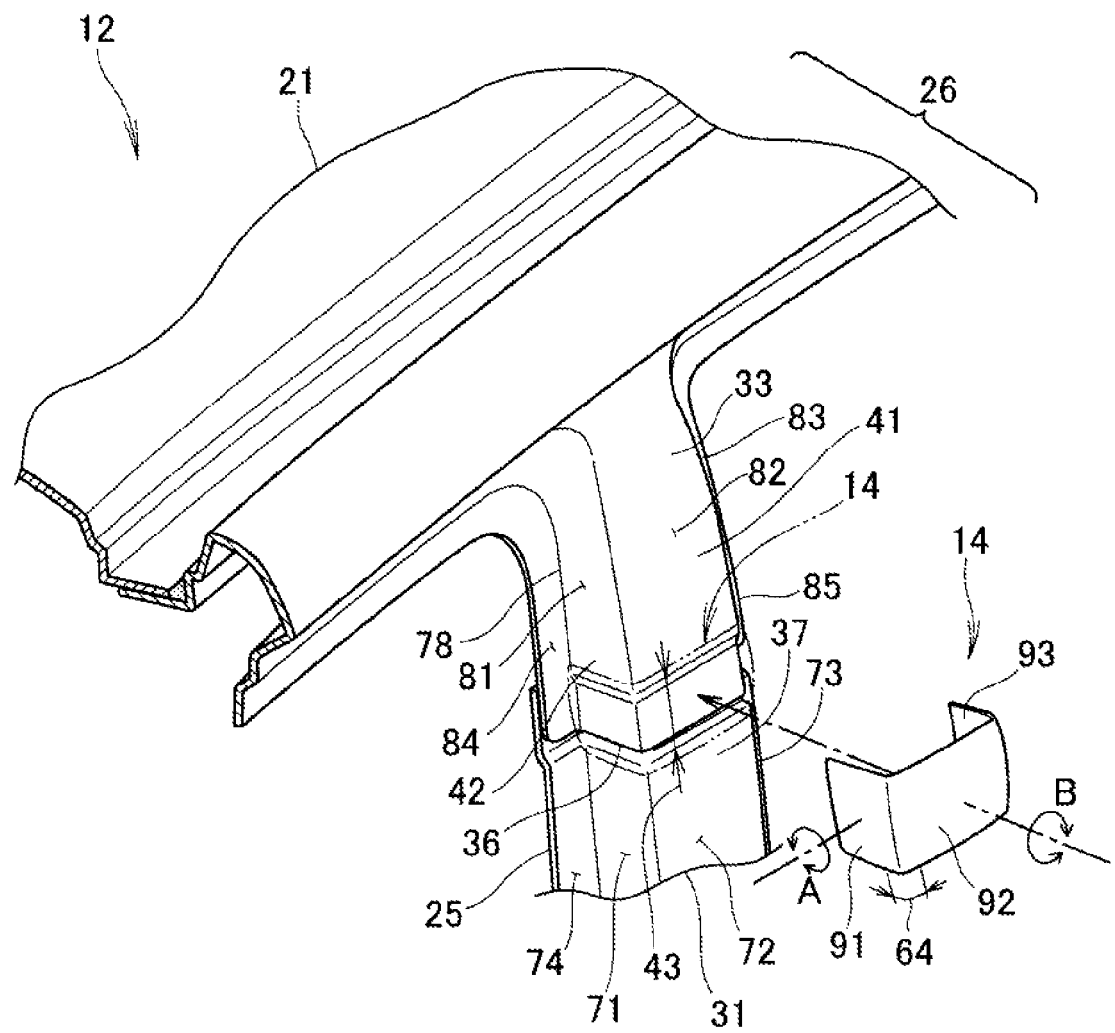
FIG. 8 is a perspective view illustrating the cover member, according to the first embodiment, as being attached.

As illustrated in FIGS. 4 and 8, the center pillar outer panel 31 is formed by a first front-wall portion 71, a first sidewall portion 72, and a first rear-wall portion 73 to have a U-shape in cross section. Then, a first front flange 74 is continuously formed on the first front-wall portion 71 and a first rear flange 75 is continuously formed on the first rear-wall portion 73. Moreover, a first overlapped joint (first bent portion 38) having a U-shape, which is bent inwardly by a depth α (see FIG. 3), is formed at the upper portion (end portion 37).

As illustrated in FIGS. 4 and 8, the roof side rail outer panel 33 includes a protrusion joint 78 formed to protrude toward the center pillar 25 from the center. The protrusion joint 78 has the U-shape as in the center pillar outer panel 31 and is formed by a second front-wall portion 81, a second sidewall portion 82, and a second rear-wall portion 83. Reference numeral 84 indicates a second front flange and reference numeral 85 indicates a second rear flange. Moreover, a second overlapped joint (second bent portion 42) having a hat shape, which is bent inwardly be a depth β (see FIG. 3), is formed at the lower portion (end portion) 41.

The connection recess portion 43 is formed by joining the first overlapped joint 38 to the second overlapped joint 42. The vehicle-body outer panel connection portion 13 is formed by attaching the cover member 14 to the connection recess portion 43.

The cover member 14 is made up of the cover body 47, the bonding film layer 51, and the painted base film layer 53.

As illustrated in FIGS. 5 and 8, the cover body 47 has the U shape and is formed by a front cover body portion 91 covering the front-wall portion 71, a center cover body portion 92 which is continuous to the front cover body portion 91 to cover the first sidewall portion 72, and a rear cover body portion 93 which is continuous to the center cover body portion 92 to cover the first rear-wall portion 73. The cover body 47 is molded by a resin composite material.

As illustrated in FIGS. 6 and 7, the resin composite material is a mixture obtained by heating and kneading a high molecular weight polymer and the magnet powder 46. The molding is performed by an extruder (screw type) or an injection molding machine using the mixture. For example, an arbitrary cross-sectional shape having a constant wall thickness is formed in such a manner that the mixture is supplied to the extruder (screw type) and is extruded from a mold tool (T die) attached to the extruder. Alternatively, the wall thickness of the cross-section is changed in such a manner that the mixture is supplied to the injection molding machine (injection) and the injection molding machine (cylinder apparatus) is touched to the mold tool to inject the mixture and to take the injected mixture out from the mold tool after opening the mold tool.

As the magnet powder 46, a ferrite-based magnetic powder, a neodymium-iron-boron-based or a samarium-iron-nitrogen-based rare earth magnetic powder or the like may be employed. As the high molecular weight polymer, synthetic rubber or the thermoplastic resin 45 is used. Examples of the synthetic rubber may include styrene-butadiene rubber, nitrile rubber, butadiene rubber, silicone rubber, butyl rubber, urethane rubber, or fluorine rubber.

The cover body 47 is laminated with the bonding film layer 51 by an extrusion lamination method or a lamination method using an adhesive. The bonding film layer 51 is, for example, a hot-melt resin adhesive formed into the film shape. The bonding film layer can be bonded to the outer panel of the steel plate by heating. The bonding film layer can be selected from an ethylene-vinyl acetate copolymer film (EVA film), a polyurethane (PU) film, a polyethylene film (PE film), and an olefin-based film other than the hot-melt resin adhesive.

The cover body 47 is laminated with the painted base film layer 53 by the extrusion lamination method or the lamination method using an adhesive. The painted base film layer 53 is, for example, a film (JP 7-53812 A). This film is a polypropylene resin composition improved in painting film adhesion and bonding property and is suitably used for applications requiring, in particular, painting, printing, and bonding in fields of automotive parts, electric and electronic parts, machine parts, toys, stationeries, daily necessities, panels, films or the like.

Next, attaching and painting ways of the cover member according to the first embodiment will be briefly described. In the painting process, first, the outer panel (obtained by bonding the center pillar outer panel 31 to the roof side rail outer panel 33) is subjected to electro-deposition painting. Subsequently, a dust sealer is applied to the electro-deposition painted outer panel (except the vehicle-body outer panel connection portion 13).

Next, as illustrated in FIG. 8, the cover member 14 is attached to the connection recess portion 43 as indicated by the dashed-two dotted line. Moreover, the painted film 95 (see FIG. 6) is obtained by painting the outer panel and painting the cover member 14 at the same time.

Finally, when the vehicle body attached with the cover member 14 is carried into a painting drying furnace to be subjected to temperature rising to a predetermined temperature, temperature keeping, and temperature lowing. When the vehicle body is subjected to the temperature rising, the bonding film layer 51 (see FIG. 7) is melted, the lip portion 56 is softened, and thus the cover member continues to be pressed against the center pillar outer panel 31 and the roof side rail outer panel 33 by a magnetic force. When the vehicle body is subjected to the temperature lowing, since the bonding film layer 51 is hardened to come in contact with the outer panel, the bonding work of the cover member 14 is automatically completed at the same time as the completion of the painting.

As illustrated in FIG. 8, when the cover member 14 is attached to the connection recess portion 43 of the vehicle body 12, since the position of the cover member 14 can be adjusted several times in the direction of an arrow A, the direction of an arrow B, and the vertical direction while coming in contact with the vehicle body 12 by the magnetic force, the cover member 14 is easy to handle.

As illustrated in FIG. 3, since the bonding film layer 51 of the cover member 14 is melted by the temperature rising in the painting drying furnace and the fringes (upper fringe 57 and lower fringe 58) of the cover member 14 come in contact with the vehicle body 12, it is not necessary to apply the dust sealer to an edge 97 of the stepped portion 36 in which the thickness of the electro-deposition painted film is thin. That is, since water does not enter the connection recess portion 43 as indicated by an arrow b1, although the thickness of the electro-deposition painted film of a paint to be applied to the edge 97 (also see FIG. 9) is thin, it is hard to corrode.

Further, as illustrated in FIG. 9, the lip portion 56 is softened by heat of the painting drying furnace to be easily worked (deformed), the cover member 14 is attracted to the vehicle body 12 by the magnet (magnetic) powder 46 mixed in the cover body 47 as indicated by an arrow b2, and the bonding film layer 51 is pressed against and welded to the vehicle body 12.

Second Embodiment

Figure 10:
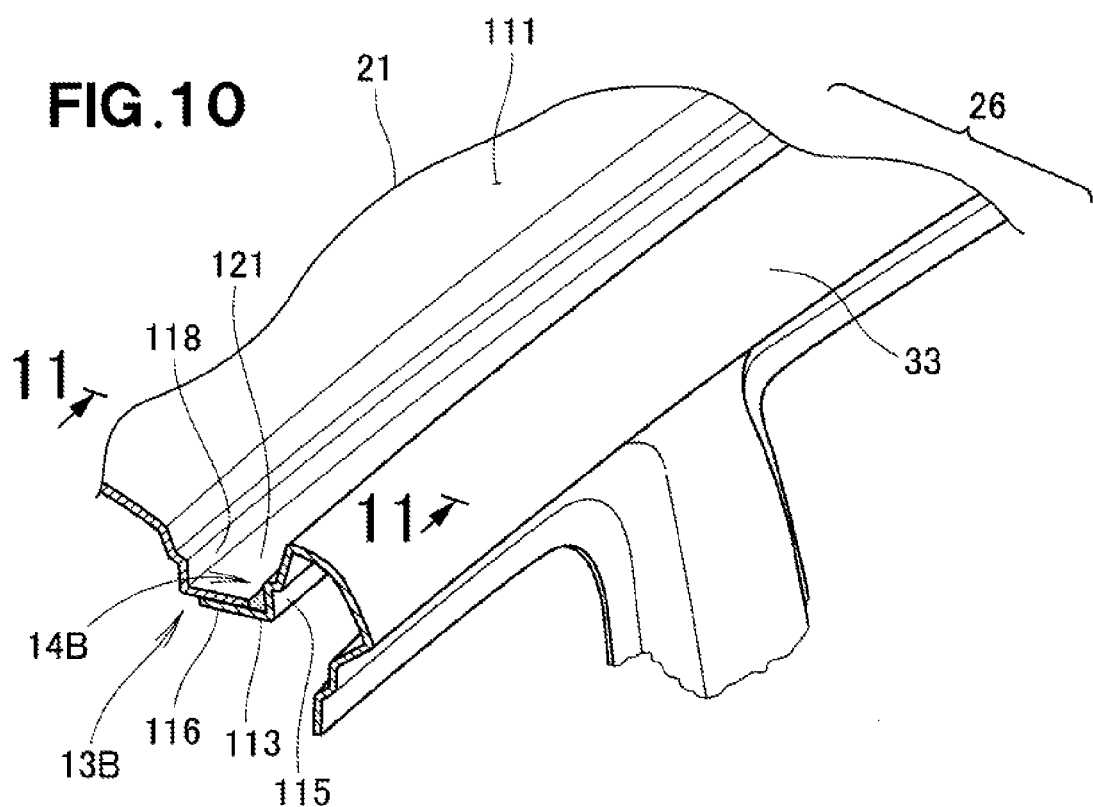
FIG. 10 is a perspective view illustrating a roof side rail outer employing a cover member of a vehicle-body outer panel connection portion according to a second embodiment.

Next, a cover member 14B of a vehicle-body outer panel connection portion 13B according to a second embodiment will be described with reference to FIGS. 10 to 12. In the vehicle-body outer panel connection portion 13B and the cover member 14B illustrated in FIGS. 10 to 12, the same configuration as in the first embodiment illustrated in FIGS. 1 to 9 will be denoted by the same reference numerals and the description thereof will not be presented. FIG. 10 corresponds to FIG. 8.

In the cover member 14B according to the second embodiment, the first vehicle-body outer panel is a roof outer panel 111. The second vehicle-body outer panel is a roof side rail outer panel 33.

Figure 11:
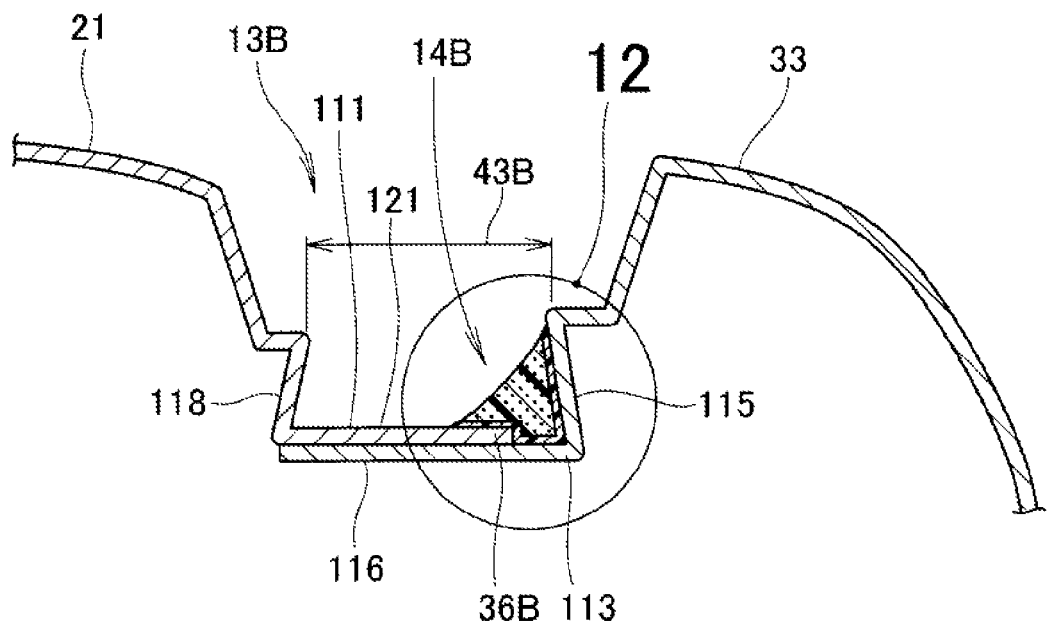
FIG. 11 is a cross-sectional view taken along line 11-11 of FIG. 10.

As illustrated in FIG. 11, a connection recess portion 43B is a roof rail connection recess portion formed by joining the roof side rail outer panel 33 to the roof outer panel 111. The cover member 14B is provided in a corner 113 of the roof rail connection recess portion 43B and is formed in a substantially triangular cross-sectional shape.

In the roof rail connection recess portion 43B, a side sidewall portion 115 is formed at an end portion of the roof side rail outer panel 33 and a side bottom portion 116 is integrally formed with the side sidewall portion 115 to be continuous thereto. Meanwhile, a roof sidewall portion 118 is formed at an end portion of the roof outer panel 111 and a roof bottom portion 121 is integrally formed with the roof sidewall portion 118 to be continuous thereto. Then, the roof bottom portion 121 is overlappingly bonded or welded to be joined to the side bottom portion 116, and an edge 122 (see FIG. 12) formed with a stepped portion 36B is located in the vicinity of the side sidewall portion 115.

Figure 12:
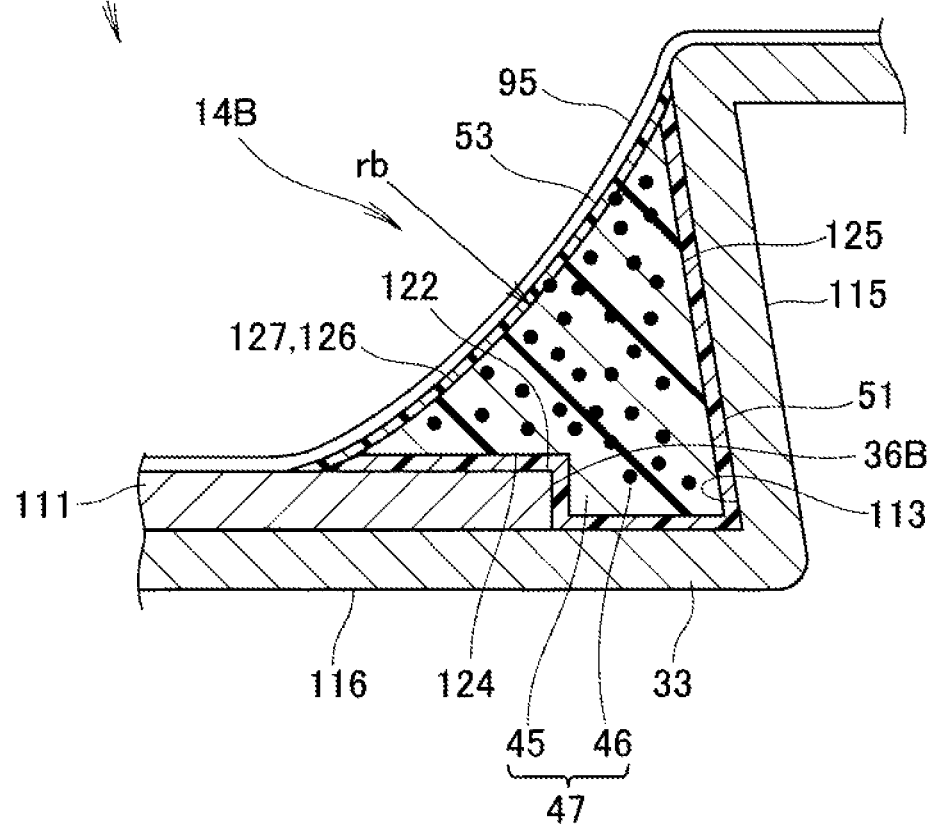
FIG. 12 is an enlarged view of region 12 of FIG. 11.

As illustrated in FIG. 12, the cover member 14B is configured by a bottom side portion 124 formed to come in closely contact with the edge 122 (by interposition of the bonding film layer 51), a vertical side portion 125 integrally formed with the bottom side portion 124 to be continuous thereto, and an oblique side portion 127 formed to have an outer surface 126 which is continuous to the vertical side portion 125 and the bottom side portion 124. The bonding film layer 51 is applied to the vertical side portion 125 and the bottom side portion 124. A painted base film layer 53 is applied to the oblique side portion 127.

The cover member 14B is subjected to temperature rising in the painting drying furnace at the same timing (painting process) similarly as in the cover member 14 according to the first embodiment to be bonded.

In the cover member 14B of the vehicle-body outer panel connection portion 13B according to the second embodiment, the shape of the cover member 14B is approximately identical to that of the corner 113 of the roof rail connection recess portion 43B and is stably attached thereto even by a magnetic force, the corner 113 becomes a smooth curved surface (having a radius of rb) to have a good appearance, the process of finely adjusting the shape of the cover member 14B is not necessary to be added in the painting process, the attaching work is completed only by directly setting the cover member 14B, and thus only the setting work time may be set.

Since the cover member 14B can cover the edge 122 formed with the stepped portion 36B, it is not necessary to apply the dust sealer to cover the edge 122. That is, generally, a base paint is painted on the vehicle body 12 by electro-deposition, but since the thickness of the electro-deposition painted film of a paint to be applied to the edge 122 becomes thin, it was necessary to apply the dust sealer. However, it is possible to eliminate the dust sealer for covering the edge 122 by the cover member 14B according to the second embodiment.

INDUSTRIAL APPLICABILITY

The cover member of the vehicle-body outer panel connection portion according to the present invention is suitable for use on vehicles.

REFERENCE SIGNS LIST

12: vehicle body
13: vehicle-body outer panel connection portion
14: cover member
22: door (front door)
23: door (rear door)
31: first vehicle-body outer panel (center pillar outer panel)
31b: surface of vehicle body
33: second vehicle-body outer panel (roof side rail outer panel)
33b: surface of second vehicle-body outer panel
36: stepped portion
37: end portion of first vehicle-body outer panel
38: first bent portion
41: end portion of second vehicle-body outer panel
42: second bent portion
43: connection recess portion
45: thermoplastic resin
46: magnet powder
47: cover body
48: attachment surface
51: bonding film layer
52: outer surface of cover body
53: painted base film layer
55: body portion
56: lip portion
57: fringe (upper fringe) of cover body
58: fringe (lower fringe) of cover body
61: seal member (front door seal member)
62: seal member (rear door seal member)
64: door seal contacting portion (front door seal contacting portion)
65: door seal contacting portion (rear door seal contacting portion)
66: fringe of (upper fringe) door seal contacting portion
67: fringe (lower fringe) of door seal contacting portion
Tr: panel thickness

The invention claimed is:

1. A cover structure of a vehicle-body outer panel connection portion, the cover structure comprising:
    a first vehicle-body outer panel that is made of a steel sheet and has a surface of a vehicle body;
    a second vehicle-body outer panel that is made of a steel sheet and has a surface which is continuous to the surface; and
    a cover member that covers a stepped portion having a height difference by a panel thickness resulted after an end portion of the second vehicle-body outer panel is connected in an overlapping manner to an end portion of the first vehicle-body outer panel,
    wherein the stepped portion is located in a connection recess portion which is formed by connecting a second bent portion, in which the end portion of the second vehicle-body outer panel is deformed centerward in a vehicle width direction, to a first bent portion in which the end portion of the first vehicle-body outer panel is deformed centerward in the vehicle width direction,
    the cover member is attached to the connection recess portion and is comprised of a cover body of a thermoplastic resin and a bonding film layer which is applied to an attachment surface forming an inner surface of the cover body facing the first vehicle-body outer panel and the second vehicle-body outer panel,
    the cover body is comprised of a thick-walled body portion formed with a thickness corresponding to a depth of the connection recess portion at a center thereof and a lip portion which is continuous to the body portion,
    the body portion is configured by forming the outer surface of the cover body in a convex curved shape, and
    the lip portion has a wall thickness which gradually decreases from the body portion toward fringes of the cover body, and, of the fringes, a fringe portion of a door seal contacting portion coming in contact with a seal member provided in a door is formed such that the convex curved outer surface of the cover body lies substantially continuously on outer surfaces of the first and second vehicle body outer panels.

2. The cover structure of the vehicle-body outer panel connection portion according to claim 1, wherein the lip portion is formed in a substantially triangular cross-sectional shape.

3. The cover structure of the vehicle-body outer panel connection portion according to claim 1, wherein the cover body is formed by mixing magnet powders with the thermoplastic resin.

4. The cover structure of the vehicle-body outer panel connection portion according to claim 1, wherein the cover member includes a painted base film layer applied to an outer surface of the cover body.

* * * * *